US008296839B2

(12) United States Patent
Sax et al.

(10) Patent No.: US 8,296,839 B2
(45) Date of Patent: Oct. 23, 2012

(54) VPN DISCOVERY SERVER

(75) Inventors: William C. Sax, McLean, VA (US);
William Wollman, Oceanport, NJ (US);
Egil H. Jegers, Eatontown, NJ (US)

(73) Assignee: The MITRE Corporation, McLean, VA (US)

( * ) Notice: Subject to any disclaimer, the term of this patent is extended or adjusted under 35 U.S.C. 154(b) by 1219 days.

(21) Appl. No.: 11/447,092

(22) Filed: Jun. 6, 2006

(65) Prior Publication Data
US 2008/0022391 A1    Jan. 24, 2008

(51) Int. Cl.
*H04L 29/06* (2006.01)
(52) U.S. Cl. .......................................... 726/15; 713/153
(58) Field of Classification Search ............... 726/2, 3, 726/11, 12, 14, 15; 713/150, 153, 189
See application file for complete search history.

(56) References Cited

U.S. PATENT DOCUMENTS

| 6,631,416 | B2* | 10/2003 | Bendinelli et al. | 709/227 |
| 6,889,321 | B1* | 5/2005 | Kung et al. | 713/153 |
| 7,373,660 | B1* | 5/2008 | Guichard et al. | 726/15 |
| 7,665,132 | B2* | 2/2010 | Hisada et al. | 726/15 |
| 7,860,114 | B1* | 12/2010 | Gallant et al. | 370/401 |
| 2002/0099937 | A1* | 7/2002 | Tuomenoksa | 713/153 |
| 2002/0112189 | A1* | 8/2002 | Syvanne et al. | 709/223 |
| 2003/0041238 | A1* | 2/2003 | French et al. | 713/153 |
| 2003/0093691 | A1* | 5/2003 | Simon et al. | 713/150 |
| 2004/0122976 | A1* | 6/2004 | Dutta et al. | 709/245 |
| 2006/0041761 | A1* | 2/2006 | Neumann et al. | 713/189 |
| 2006/0185012 | A1* | 8/2006 | Olivereau et al. | 726/14 |
| 2006/0195896 | A1* | 8/2006 | Fulp et al. | 726/11 |
| 2007/0294757 | A1* | 12/2007 | Stephens et al. | 726/12 |

* cited by examiner

*Primary Examiner* — Gilberto Barron, Jr.
*Assistant Examiner* — Abdulhakim Nobahar
(74) *Attorney, Agent, or Firm* — Sterne, Kessler, Goldstein & Fox p.l.l.c.

(57) ABSTRACT

Methods and systems for enabling robust routing between protected enclaves over an unsecured network are provided herein. In one aspect, the present invention provides methods and systems for enabling routing among a plurality of protected enclaves, each supported by one or more secure gateways, over an unsecured network. Methods and systems according to the present invention achieve key routing requirements while presenting solutions that can be readily scaled to large network environments. In another aspect, the present invention provides methods and systems for implementing a Prefix Discovery Server (PDS) that enables the mapping of Plain Text (PT) networks to secure gateways, maintains current network routing information, and assists VPN gateways in determining routes to remote protected enclaves.

21 Claims, 6 Drawing Sheets

VPN DISCOVERY SERVER

STATEMENT REGARDING FEDERALLY-SPONSORED RESEARCH AND DEVELOPMENT

The U.S. government has a paid-up license in this invention and the right in limited circumstances to require the patent owner to license others on reasonable terms as provided for by the terms of Contract No. 0705M880-W1 awarded by the United States Army.

FIELD OF THE INVENTION

The present invention relates generally to secure routing. More particularly, the invention relates to a Virtual Private Network (VPN) discovery server for enabling efficient routing between VPNs.

BACKGROUND OF THE INVENTION

VPN gateways are used in commercial internets, government enterprise networks, and military tactical networks. VPN gateways provide security and privacy for IP data traffic when enclaves of higher security levels (protected networks) must use networks of lower security levels for communication (e.g., corporate networks using the Internet for data transport).

Typically, VPN gateways isolate the routing information of higher security networks from being visible in lower security transport networks. For example, a VPN gateway may provide a protected enclave an IP Secure (IPSec) encryption service. Accordingly, routing between protected enclaves entails being able to map remote protected enclaves (Plain Text (PT) networks) to corresponding VPN gateways having Cipher Text (CT) network addresses.

While this may be a straightforward task in static networks, several key requirements need to be present in order to enable robust routing between protected enclaves in dynamic networks, such as military tactical networks, for example. These requirements include, for example, easily discovering peer VPN gateways and their protected enclaves once connected to the network, detecting failed or "dead" peer VPN gateways, and adapting security associations (SAs) (a group of security settings related to a VPN tunnel) among VPN gateways according to changes in VPN gateway network topology and/or network conditions.

Further, in networks having high operational tempo, such as military tactical networks, for example, management and configuration required for realizing the above described requirements is a critical concern. Accordingly, protocols for enabling robust routing in networks implementing VPN gateways need to be easy to implement, deploy, manage and configure.

What is needed therefore are methods and systems for enabling robust routing between protected enclaves using VPN gateways while satisfying the above described requirements.

BRIEF SUMMARY OF THE INVENTION

Methods and systems for enabling robust routing between protected enclaves over an unsecured network are provided herein.

In one aspect, the present invention provides methods and systems for enabling routing among a plurality of protected enclaves, each supported by one or more secure gateways, over an unsecured network. Methods and systems according to the present invention achieve key routing requirements while presenting solutions that can be readily scaled to large network environments.

In another aspect, the present invention provides methods and systems for implementing a Prefix Discovery Server (PDS) that enables the mapping of Plain Text (PT) networks to secure gateways, maintains current network routing information, and assists VPN gateways in determining routes and VPN connections to remote protected enclaves.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will be described with reference to the accompanying drawings. The drawing in which an element first appears is typically indicated by the leftmost digit(s) in the corresponding reference number.

DETAILED DESCRIPTION OF THE INVENTION

1. Introduction

VPN gateways are used in commercial internets, government enterprise networks, and military tactical networks. VPN gateways provide security and privacy for IP data traffic when enclaves of higher security levels (protected networks) must use networks of lower security levels for communication (e.g., corporate networks using the Internet for data transport).

When used in highly dynamic networks, such as military tactical networks, certain key routing requirements must be achieved. These include, for example, easily discovering VPN gateways and their protected enclaves once connected to the network, detecting failed or "dead" VPN gateways, and adapting security associations (SAs) (connection-specific parameters) among VPN gateways according to changes in VPN gateway network topology and/or network conditions. In addition to these routing requirements, management and operations requirements for VPN gateways must be minimized.

Figure 1:
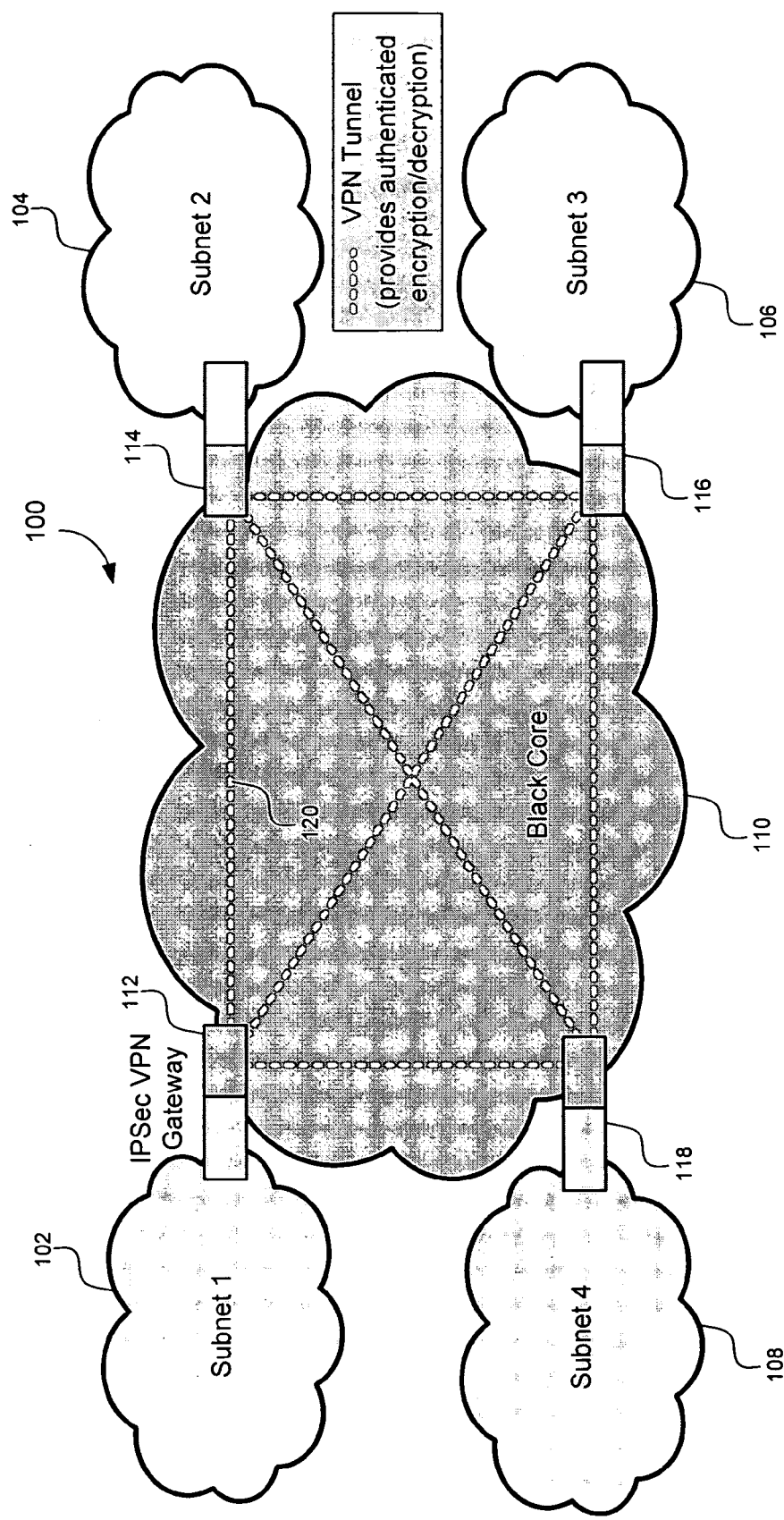
FIG. 1 illustrates an example topology that employs VPN gateways to enable secure communication between protected enclaves over an unsecured network.

FIG. 1 illustrates an example topology 100 that employs VPN gateways to enable secure communication between protected enclaves over an unsecured network. When used herein, a protected enclave refers to a group of one or more secure networks. Secure networks are also referred to as Plain Text (PT) networks since data traffic within said networks is typically not encrypted. A protected enclave includes one or more network prefixes (network addresses).

In FIG. 1, protected enclaves 102, 104, 106, and 108 communicate over an unsecured black core network 110. Each protected enclave 102, 104, 106, and 108 employs a VPN gateway 112, 114, 116, and 118, respectively. The VPN gateway provides the protected enclave with an IP Security (IP Sec) encryption service. Accordingly, data traffic originating from one of the protected enclaves and traversing black core network 110 is encrypted by its corresponding VPN gateway.

A VPN gateway may support one or more protected enclaves. In turn, a protected enclave may have access to one or more VPN gateways. For example, a protected enclave may use two VPN gateways to receive encrypted data traffic from other protected enclaves, wherein each VPN gateway is dedicated to delivering data traffic of a pre-determined type.

Typically, communication between protected enclaves is achieved by setting up VPN tunnels between VPN gateways that support the communicating enclaves. VPN tunnels provide authenticated encryption/decryption services to the protected enclaves. Referring to the example of FIG. 1, protected enclaves 102 and 104 communicate using VPN tunnel 120 over black core network 110. VPN tunnel 120 is set up between VPN gateways 112 and 114, which support protected enclaves 102 and 104, respectively.

Figure 2:
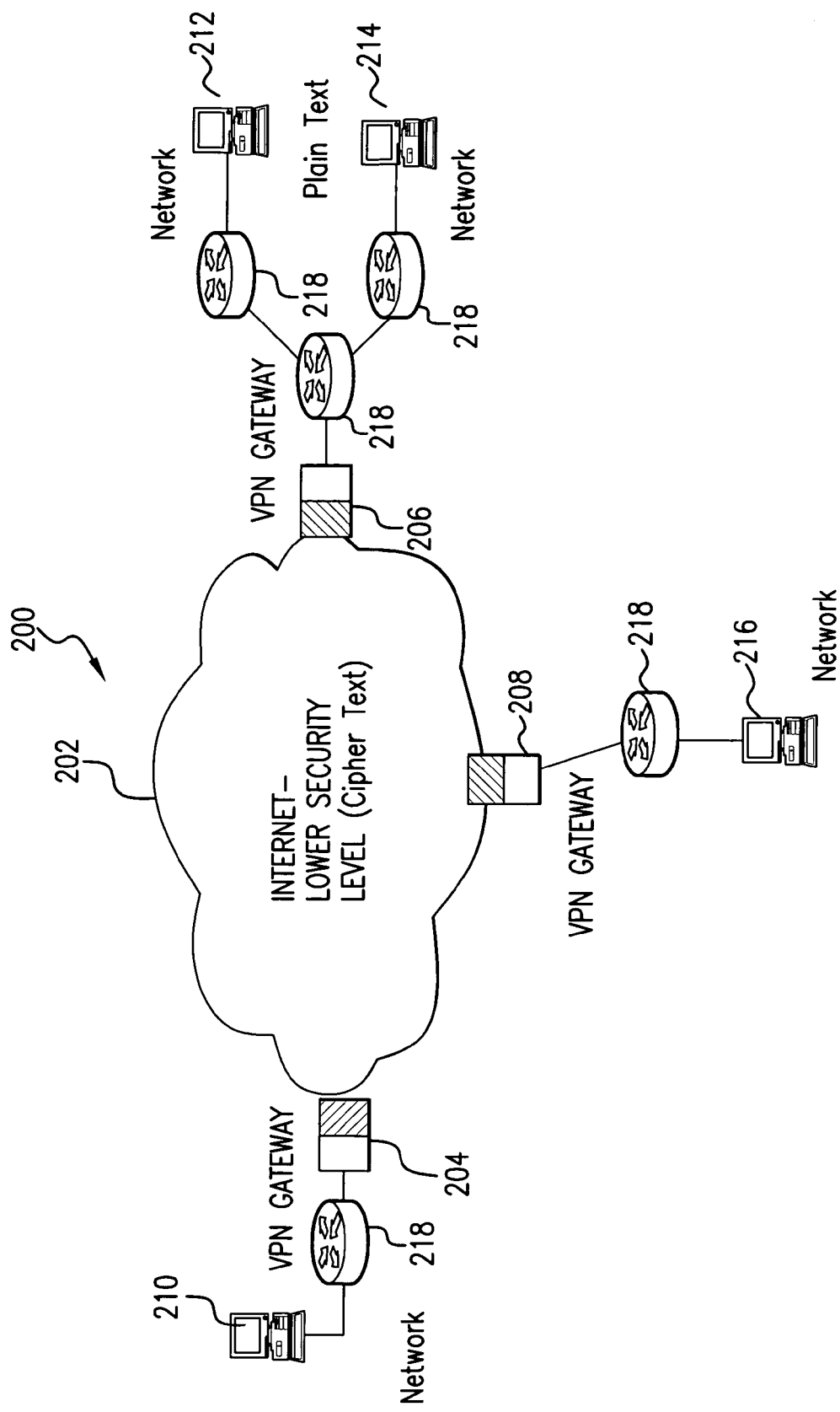
FIG. 2 illustrates an example topology that employs VPN gateways to enable secure communication between Plain Text (PT) networks over a Cipher Text (CT) network.

FIG. 2 is another example topology 200 that employs VPN gateways to enable secure communication between protected enclaves over an unsecured network. In the example of FIG. 2, protected enclaves communicate over the Internet 202, which is a low security level network. VPN gateway 204 supports a first protected enclave, which includes network 210. VPN gateway 206 supports a second protected enclave, which includes networks 212 and 214. VPN gateway 208 supports a third protected enclave, which includes network 216. A plurality of routers 218, as shown in FIG. 2, may be used within a protected enclave, as needed, to route traffic to networks within the enclave.

In an exemplary communication between protected enclaves in FIG. 2, traffic originating from network 210 (within the first protected enclave) and destined to network 212 (within the second protected enclave) is encrypted by VPN gateway 204, before being transmitted over the Internet 202 to VPN gateway 206. Typically, a VPN tunnel (not shown in FIG. 2) is set up between VPN gateways 204 and 206. Once received at VPN gateway 206, the encrypted data traffic is decrypted and routed to network 212. Inherent within this process is the ability of network 210 to determine a correct routing path to network 212 over network topology 200. This includes having knowledge at network 210 of VPN gateways that support and reach network 212.

Accordingly, routing in a network that uses VPN gateways, such as network topology 200 for example, entails having sufficient information about the VPN gateway topology.

In static networks with little or no changes in network topology (including prefixes and VPN gateways), VPN gateways may be configured with pre-determined routes to reach remote protected enclaves in the network. Alternatively, VPN gateways share routing information with each other in order for each VPN gateway to generate a complete view of the network topology, based on which routing is performed.

While these approaches may be suitable for static networks, dynamic networks with frequently changing topology require more adaptive techniques for enabling robust routing between protected enclaves in a network using VPN gateways. Several key routing requirements, discussed in more detail below, need to be present for dynamic networks.

Peer Discovery

Peer discovery is the process by which a source VPN gateway locates a corresponding target VPN gateway in a Cipher Text (CT) domain that reaches a target host for which traffic is intended. While routing technology is adequate for the proper delivery of IP traffic in the absence of secure VPNs, the use of VPN tunnels may create routing problems. For example, IP addressing is no longer transparent from end-to-end due to encryption in VPN tunnels or the use of (RFC 1918) private IP address space.

Adaptive Security Association (SA) Management

Robust networks leveraging VPN gateways must be able to adapt to changes in network topology and/or network conditions. This includes adapting to the addition, failure, or mobility of network infrastructure that affect routing paths in the network. Further, networks must be able to monitor the performance of established routes (e.g., VPN tunnels), modify settings (Security Associations) associated with these routes, or establish better routes when necessary.

Peer Failure Detection

Detection of peers which have failed, or are no longer reachable, is necessary in any type of network in order to avoid single point communication failures. This is particularly required in networks that leverage VPN gateways. For example, a VPN gateway may not be able to determine that a SA is no longer valid and to initiate a new SA without the ability to detect failed peers.

Management and Operations

Resources required for management and operations of VPN gateways must be minimized. In military tactical networks, for example, management is a critical concern. This is due to the difficulty of configuring and maintaining military tactical networks given their high operational tempo and the limited availability of properly cleared and experienced personnel.

2. VPN Discovery Server

The present invention provides methods and systems for enabling routing among a plurality of protected enclaves, each supported by one or more VPN gateways, over an unsecured network. Methods and systems according to the present invention achieve the above described key routing requirements while presenting solutions that can be readily scaled to large network environments.

In an embodiment of the present invention, methods and systems are provided for implementing a VPN-based Prefix Discovery Server (PDS) that enables the mapping of Plain Text (PT) or protected networks to VPN gateways that support these networks, maintains current network routing information, and assists VPN gateways in determining routes to remote protected enclaves.

In other embodiments, the VPN-based PDS allows for a fewer number of VPN gateways to be employed and eliminates the need for backup gateways. This is the case since the PDS allows for more efficient utilization of VPN gateways and for dynamic switching of traffic among gateways. Further, the PDS improves network scalability as it enables load-balancing among VPN gateways and requires minimal configuration for adding new or removing VPN gateways.

2.1 Exemplary Topology

Figure 3:
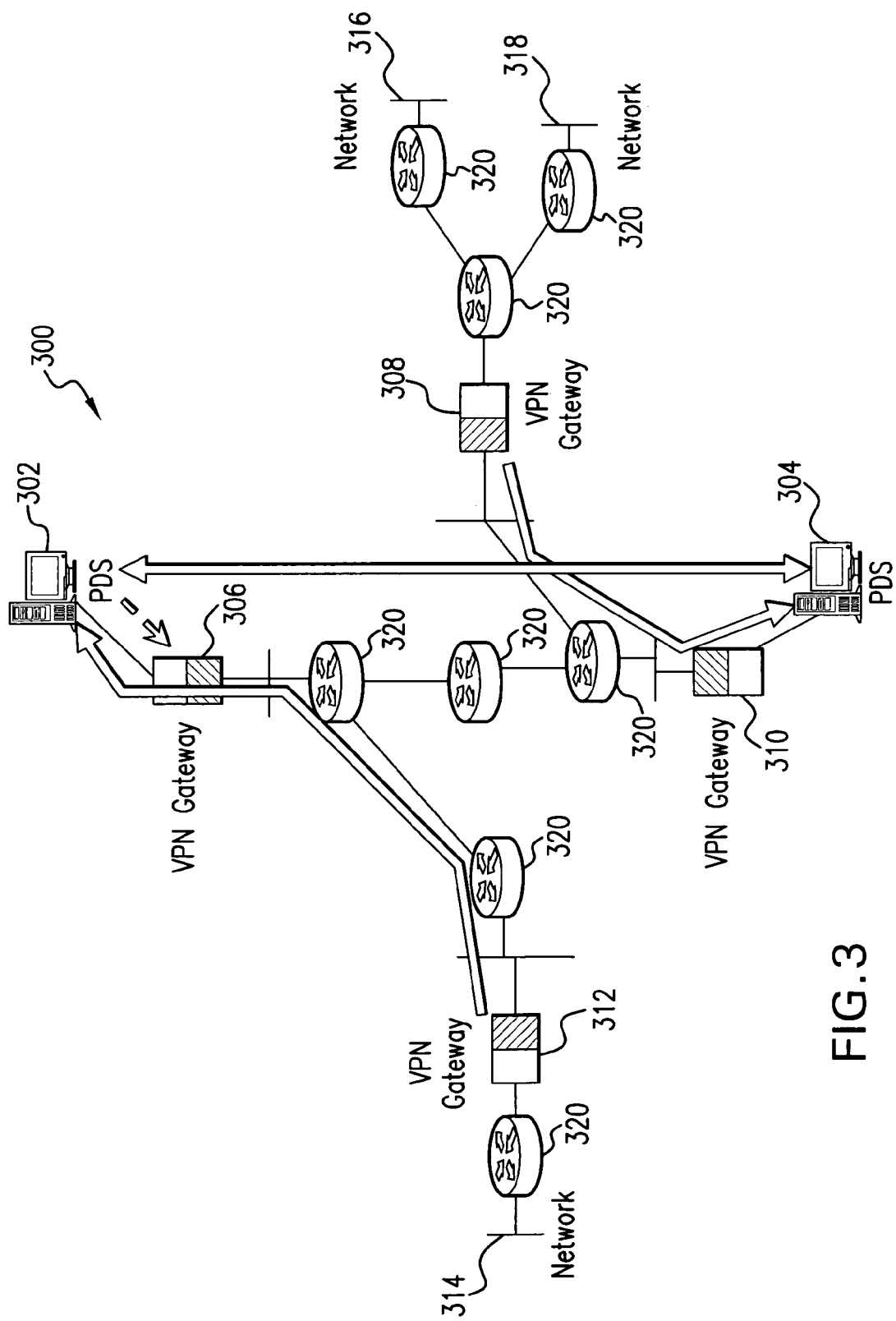
FIG. 3 illustrates an example topology that employs VPN Discovery Servers to enable secure communication between protected enclaves over an unsecured network.

FIG. 3 illustrates an example topology 300 that employs VPN-based Prefix Discovery Servers (PDSs) to enable secure communication between protected enclaves over an unsecured network.

Example topology 300 includes PDSs 302 and 304, protected networks 314, 316 and 318, VPN gateways 306, 308, 310, and 312, and a plurality of routers 320 for routing data traffic between the different elements of topology 300.

Network 314 is supported by VPN gateway 312. Networks 316 and Z 318 are supported by VPN gateway 308. Accordingly, in example topology 300, links connecting VPN gateways to their protected networks (e.g., links connecting VPN gateway 312 to network 314) represent secure links. Data traffic is not encrypted over these links. On the other hand, links connecting VPN gateways to each other (e.g., links connecting VPN gateway 312 to VPN gateway 306) are unsecured links and data traffic needs to be encrypted when routed over these links.

2.2 Method Embodiments

Figure 5:
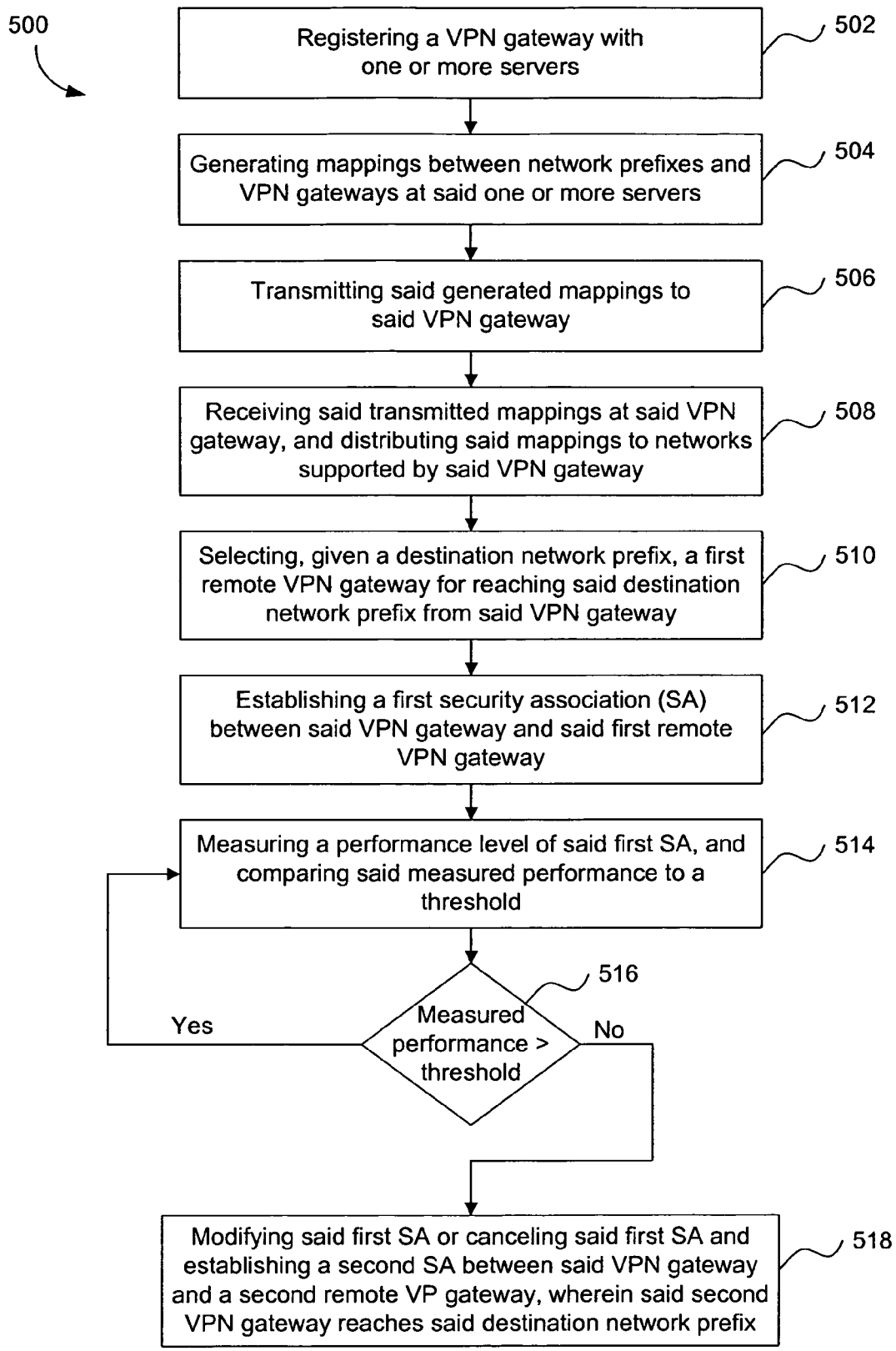
FIG. 5 is a process flowchart that illustrates a method for enabling robust routing between protected enclaves over an unsecured network.

A method for enabling robust routing among a plurality of protected enclaves, wherein each of the protected enclaves is supported by one or more Virtual Private Network (VPN) gateways will now be provided, according to an embodiment of the present invention. The method is illustrated by process flowchart 500 of FIG. 5, and will be described with continued reference to example topology 300 of FIG. 3.

PDS Registration

Process flowchart 500 begins in step 502, which includes registering a VPN gateway with one or more servers. In an embodiment, the servers are VPN-based Prefix Discovery Servers. Typically, step 502 is achieved by the VPN gateway contacting the nearest PDS server and registering with the server network prefixes for which it provides reachability. Referring to FIG. 3, for example, VPN gateway 312 contacts PDS 302 to register network 314. Similarly, VPN gateway 308 contacts PDS 304 to register networks 316 and 318. In embodiments, the VPN gateway is pre-configured with a set of reachable or supported network prefixes to register with the PDS. In other embodiments, the VPN gateway dynamically discovers reachable network prefixes through participation in the interior routing protocol of the protected enclaves directly attached thereto.

The VPN gateway may register with one or more servers. Further, the VPN gateway registration may include registering with the PDS server(s) one or more metrics associated with the VPN gateway. These metrics may include, among others, application types supported by the gateway, traffic types supported by the gateway, prefix administrative costs associated with the gateway, and/or preference values associated with the gateway.

Typically, metrics are assigned to the VPN gateway by the enclaves or networks that it supports. Accordingly, for example, a multi-homed enclave (supported by more than one gateway) can configure a first VPN gateway to support Voice over IP and/or video teleconferencing, a second VPN gateway to support inbound web server requests, and a third VPN gateway to support all other inbound and outbound traffic. Similarly, a protected enclave may use a preference value to distinguish one VPN gateway as preferred over another. This preference value combined with traffic differentiators (used to route traffic through gateways according to traffic type) provides a VPN gateway with layer 4 switching functionality. In other embodiments, the preference value may be used by a multi-home enclave to enabling load-balancing Process flowchart 500 continues at the PDS side, and in step 504 includes generating mappings between network prefixes and VPN gateways. The mappings may be in the form of prefix routing tables that indicate for each known prefix in the network the one or more VPN gateways that may reach that prefix. The mappings may also include associated metrics as indicated during registration. In embodiments, the mappings are referred to as plain text to cipher text mappings.

The PDS may be configured to push the generated mappings (and associated metrics) to all VPN gateways registered therewith. Alternatively, a VPN gateway may query the PDS for mappings for one or more remote network prefixes. In an embodiment, the VPN gateway informs the PDS during registration whether or not it will query for prefixes or expect periodical registration updates from the server. Accordingly, step 506 of process flowchart 500 includes transmitting the generated mappings to the VPN gateway by the PDS server(s). It is noted that PDSs may also share generated mappings among each other. For example, as shown in FIG. 3, PDS 304 and PDS 302 exchange registration information with one another. PDSs may then additionally distribute to VPN gateways mappings learned from other PDS servers in step 506.

In addition, the PDS may periodically update its mappings based on detected changes in VPN gateway topology. For example, when a VPN gateway de-registers itself and its supported enclaves from a PDS, the PDS may update its mappings and inform VPN gateways that received mappings from it of any changes.

Peer Discovery and Local Enclave Distribution

Process flowchart 500 continues in step 508, which includes receiving the transmitted mappings at the VPN gateway, and distributing the mappings to networks or enclaves supported by the VPN gateway. In an embodiment, the VPN gateway, upon receiving the mappings, uses the received mappings to discover peer VPN gateways in the network.

In another embodiment, the VPN gateway is configured to distribute received mappings using the interior routing protocols of enclaves directly attached thereto. In embodiments, the metrics associated with the mappings may have to be modified according to the type of routing protocol used within each enclave before distribution. This may be necessary when enclaves supported by a VPN gateway each uses a different interior routing protocol. For example, one enclave may use Routing Information Protocol (RIP) metrics while another may use (Open Shortest Path First) OSPF metrics. In other embodiments, the metrics learned from the PDS(s) are distributed without modification to the enclaves.

This local enclave distribution function, combined with the ability of VPN gateways to perform metric-based prefix registration as described above, permits routing to occur through multiple sets of PT/CT concatenated networks, as will be further described below.

Peer Gateway Selection

Routing between protected enclaves according to an embodiment of the present invention will now be described with continued reference to process flowchart 500.

As described above, the VPN gateway may have the PDS(s) periodically forward thereto registration updates or may query the PDS(s), on-demand, for addresses of remote VPN gateways given a remote network prefix that it is trying to reach. Based on the information received from the PDS(s), the VPN gateway may select a peer VPN gateway for communicating with the remote network prefix. The selected peer VPN gateway is one that may reach the remote network prefix.

Accordingly, step 510 of process flowchart 500 includes selecting, given a destination network prefix, a first remote VPN gateway for reaching said destination network prefix from said VPN gateway. In an embodiment, selecting the remote VPN gateway is done according to one or more metrics as described above: application types supported by the remote gateway, traffic types supported by the remote gateway, a prefix administrative cost associated with the remote gateway, and/or a preference value associated with the remote gateway.

For example, a PDS server may provide a source VPN gateway with both multiple prefix administrative costs for a set of remote VPN gateways and multiple preference levels for traffic differentiators for the same set of remote VPN gateways, given a destination network prefix reachable by the set of remote VPN gateways. The source VPN gateway may then select the remote peer for communicating with the destination prefix by traffic differentiation and then by prefix administrative cost.

Security Association (SA) Setup and Management

Once the VPN gateway has selected in step 510 the first remote VPN gateway for reaching the destination network prefix, the VPN gateway proceeds, in step 512, to establish a first security association (SA) between itself and the first remote VPN gateway. The SA represents a group of security settings related to a VPN tunnel established between the VPN gateway and the first remote VPN gateway. In an embodiment, the SA is an IPSec SA.

Typically, step 512 includes receiving the selected first remote VPN gateway's cipher text address and public key. Messages are then exchanged between the VPN gateway and the first remote VPN gateway to negotiate the VPN tunnel. The public key will be used for encrypting/decrypting traffic between the two gateways.

After the SA has been established, the VPN gateway uses IPSec dead peer detection or equivalent functionality to help assess the health of the connection and permit peer failure detection. IPSec dead peer detection exchanges periodic keep-alive type messages through the VPN tunnel when there is no traffic flowing. If there is no response from the remote gateway within a configured time, the tunnel is deleted.

Further, the VPN periodically queries the PDS(s) to determine if a better remote VPN gateway is available to replace the current first remote VPN gateway. Accordingly, in an embodiment as in step 514, process 500 includes measuring a performance level of the first SA, and comparing the measured performance to a threshold. Based on the result of the comparison in step 516, the VPN gateway may decide either to maintain the current first SA, or to proceed in step 518 to modifying the first SA or canceling the first SA and establishing a second SA with a second remote VPN gateway that supports the destination network prefix. Alternatively, the VPN gateway may determine to switch from the first SA to the second SA solely based upon an expected positive change in performance level. In this case, step 516 may be omitted in process flowchart 500.

Routing in PT/CT Concatenated Networks

Methods and systems, according to the present invention, allow for seamless routing through concatenated PT/CT networks. This, as described above, is due to the ability of VPN gateways to perform metric-based prefix registration combined with local enclave distribution and inter-PDS(s) exchange of registration information. Accordingly, VPN tunnels can be established to connect remote protected enclaves that are separated by more than one unsecured networks. In addition, VPN tunnels between remote gateways may be adapted according to changes in network topology and/or network conditions. This is further illustrated below with reference to FIGS. 4A and 4B.

Figure 4A:
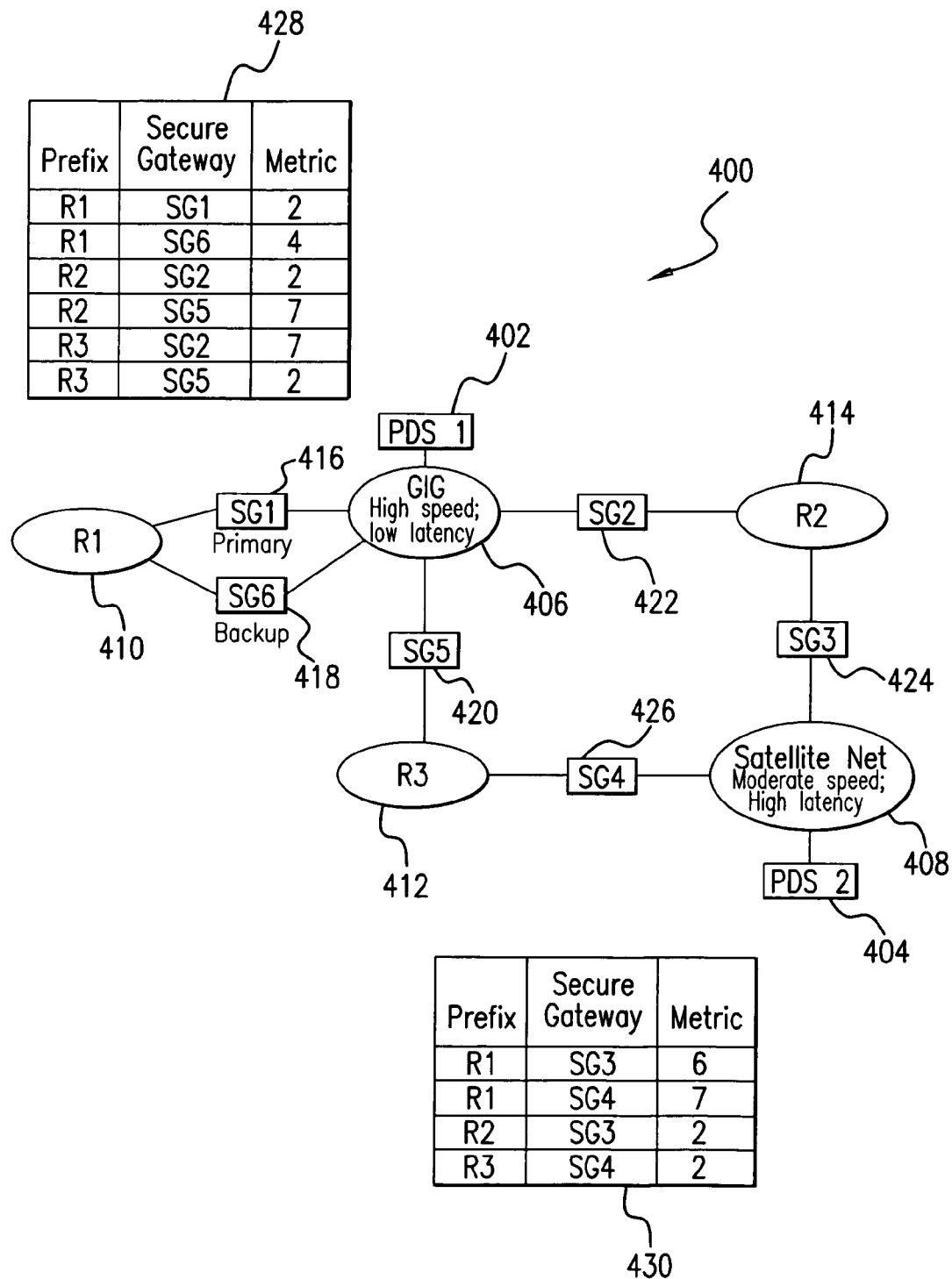
FIG. 4A illustrates an example topology of Plain Text (PT)/Cipher Text (CT) concatenated networks.

FIG. 4A illustrates an example topology 400 of Plain Text (PT)/Cipher Text (CT) concatenated networks. Topology 400 includes a plurality of PT networks 410, 412, and 414, Prefix Discovery Servers 402 and 404, and Secure Gateways 416, 418, 420, 422, 424, and 426.

A high speed low latency network GIG 406 and a moderate speed high latency satellite network 408 serve as transport networks between PT networks 410, 412, and 414. GIG 406 and satellite network 408 represent CT networks.

Secure gateways 416 and 418 support PT network 410 with secure gateway 416 being a primary gateway and secure gateway 418 being a backup gateway. Similarly, secure gateways 422 and 424 support PT network 414, and secure gateways 426 and 420 support PT network 412.

Prior to routing over topology 400, the secure gateways perform a metric-based registration, as described above, with servers 402 and 404. The secure gateways register with the nearest PDS. In the example of FIG. 4A, secure gateways 416, 418, 420, and 422 register with server 402. Secure gateways 424 and 426 register with server 404.

As shown in FIG. 4A, the registration results in prefix routing tables 428 and 430 at servers 402 and 404, respectively. Referring to prefix routing table 428, secure gateway 416 registers network prefix R1 with an associated metric of 2. Secure gateway 418 registers network prefix R1 with an associated metric of 6. This is because secure gateway 416 as the primary is preferred to secure gateway 418, which is the backup.

Typically, routes between PT networks are determined according to the metrics provided in the prefix routing tables with routes associated with lower cost metrics preferred to ones with higher cost metrics. Other factors may be considered when a plurality of routes with same cost metrics exist. Referring to FIG. 4A for example, note that PT network 414 may communicate with PT network 412 by setting up a secure tunnel between secure gateways 424 and 426 over satellite network 408. Secure gateway 426 advertises a cost metric of 2 for reaching PT network 412 (prefix R3) in prefix routing table 430. Similarly, PT network 414 may communicate with PT network 412 by setting up a secure tunnel between secure gateways 422 and 420 over GIG network 406. Secure gateway 420 also advertises a cost metric of 2 for reaching PT network 412 (prefix R3) in prefix routing table 428. Accordingly, network 414 may use other factors to determine the optimal route to network 412. In the specific example of FIG. 4A, network 414 may select the route over GIG network 406 due to GIG 406 being a high speed low latency network, for example. Similarly, network 412 may prefer secure gateway 420 for communication with networks 410 and 414, but employs secure gateway 426 as an alternate.

As described above, an important feature according to the present invention is the ability to dynamically adapt secure tunnels between protected enclaves according to changes in network topology and/or network conditions. This, as discussed above, is due to VPN gateways having the ability to discover peer gateways, detect failed peers, periodically receive registration updates from PDSs, and continuously monitor the performance of setup secure tunnels.

Figure 4B:
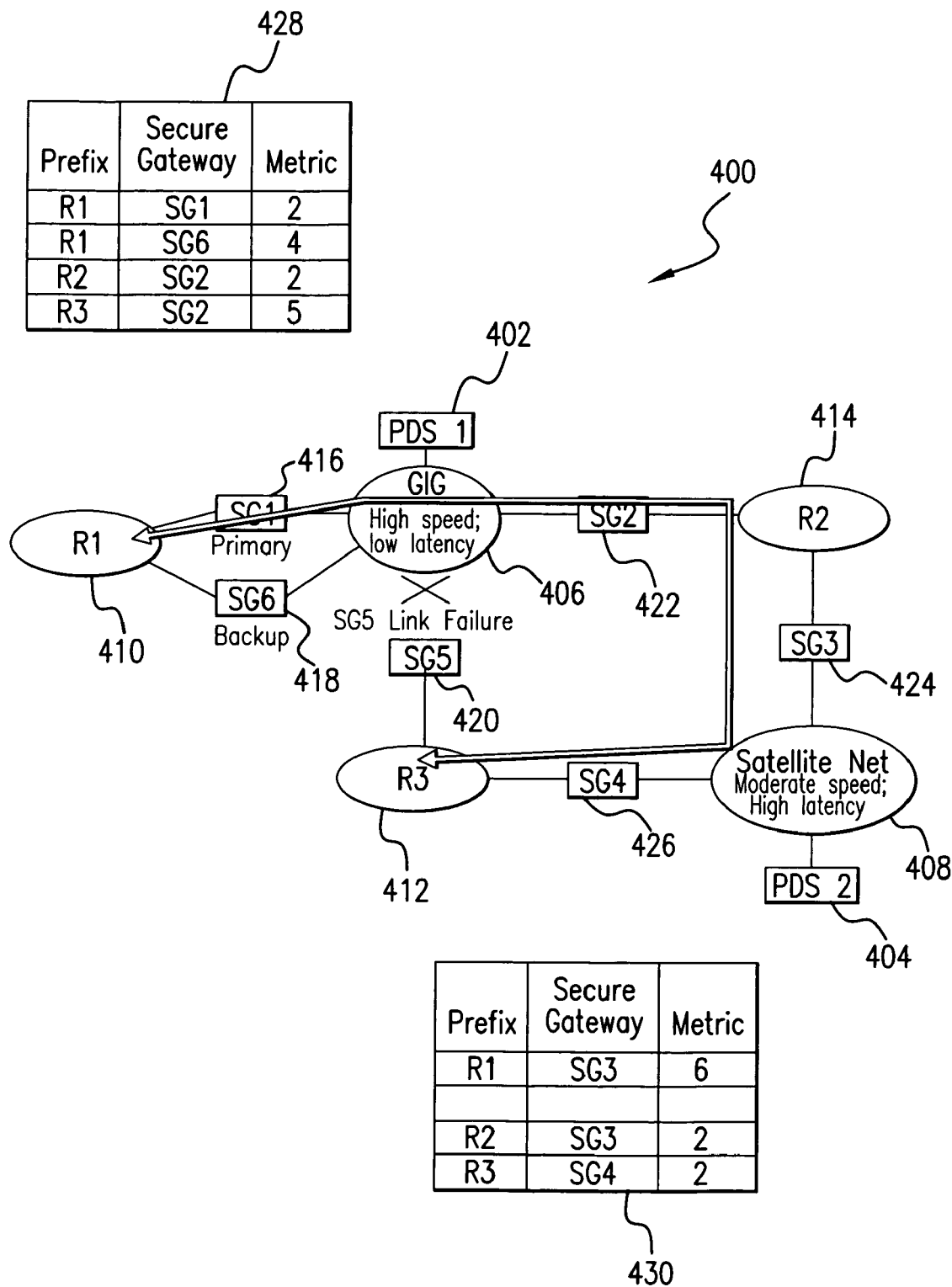
FIG. 4B is an example that illustrates routing adaptability to topology changes in the example topology of FIG. 4A.

FIG. 4B is an example that illustrates routing adaptability to topology changes in the example topology of FIG. 4A. In the example of FIG. 4B, a link failure causes secure gateway 420 to lose its link to GIG network 406. This link failure causes a change in network topology. Specifically, the link failure results in PT network 412 losing its preferred route to PT networks 410 and 414.

In an example, PT network 412 may detect the link failure after several keep-alive messages to network 410 over a secure tunnel between secure gateways 420 and 416 are unanswered. Subsequently, PT network 412 may query server 404 for an alternative gateway that may reach network 410. A new route that now spans both satellite network 408 and GIG network 406 and comprising three VPN tunnels (between secure gateways 426-424, 424-422, and 422-416) is established between PT networks 412 and 410, as shown in FIG. 4B.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for enabling routing among a plurality of protected enclaves, wherein each of the protected enclaves includes one or more plain text (PT) networks and is supported by one or more Virtual Private Network (VPN) gateways of a plurality of VPN gateways, the method comprising:
registering a VPN gateway with one or more prefix discovery servers, wherein registering said VPN gateway comprises registering, with said one or more prefix discovery servers, network prefixes within said protected enclaves reachable by said VPN gateway;
receiving from said one or more prefix discovery servers, at said VPN gateway, registered network prefixes within said protected enclaves, including receiving mappings, generated by said one or more prefix discovery servers, between said registered network prefixes and VPN gateways enabled to reach said registered network prefixes. wherein the mappings have associated metrics for using said VPN gateways to reach said registered network prefixes;
distributing said mappings and associated metrics to said protected enclaves reachable by said VPN gateway; and
determining, using said received mappings and associated metrics, routing paths between said protected enclaves reachable by said VPN gateway and other protected enclaves of said plurality of protected enclaves.

2. The method of claim 1, further comprising:
pre-configuring said VPN gateway with a set of reachable network prefixes.

3. The method of claim 1, further comprising:
dynamically discovering reachable network prefixes at said VPN gateway.

4. The method of claim 1, wherein registering said VPN gateway further comprises registering, with said one or more prefix discovery servers, one or more metrics associated with said VPN gateway.

5. The method of claim 4, wherein said one more metrics include one or more of application types supported by said VPN gateway, traffic types supported by said VPN gateway, prefix administrative costs associated with said VPN gateway, and preference values associated with said VPN gateway.

6. The method of claim 1, wherein said mappings and associated metrics are transmitted by said one or more prefix discovery servers to said VPN gateway.

7. The method of claim 6, further comprising:
transmitting a query to said one or more prefix discovery servers, wherein said query includes a target network prefix; and
receiving from said one or prefix discovery servers mappings associated with said target network prefix.

8. The method of claim 6, wherein said mappings and associated metrics are periodically distributed to said plurality of VPN gateways.

9. The method of claim 1, further comprising:
selecting a first remote VPN gateway for reaching a network prefix from said VPN gateway; and
establishing a first security association (SA) between said VPN gateway and said first remote VPN gateway.

10. The method of claim 9, wherein said selecting step comprises selecting said first remote VPN gateway according to one or more of application types supported by said first remote VPN gateway, traffic types supported by said first remote VPN gateway, prefix administrative costs associated with said first remote VPN gateway, and preference values associated with said first remote VPN gateway.

11. The method of claim 9, further comprising:
measuring a performance level of said first SA; and
comparing said measured performance level to a threshold.

12. The method of claim 11, further comprising, if said measured performance level is lower than said threshold:
modifying said first SA; or
canceling said first SA and establishing a second SA between said VPN gateway and a second remote VPN gateway, wherein said second remote VPN gateway reaches said network prefix.

13. A system for enabling routing among a plurality of protected enclaves, wherein each of said protected enclaves includes one or more plain text (PT) networks and is supported by one or more Virtual Private Network (VPN) gateways, the system comprising:
a VPN gateway; and
one or more prefix discovery servers (PDS);
wherein said VPN gateways includes a first processor configured to perform a first method, the first method comprising:
registering, with said one or more PDS(s), network prefixes within said protected enclaves reachable by said VPN gateway;
receiving, from said one or more PDS(s), registered network prefixes within said protected enclaves, including receiving mappings between said registered network prefixes and VPN gateways enabled to reach said registered network prefixes wherein the mappings have associated metrics for using said VPN gateways to reach said registered network prefixes; and
determining, using said received mappings and associated metrics, routing paths between said protected enclaves reachable by said VPN gateway and other protected enclaves of said plurality of protected enclaves, and
wherein each of said one or more PDS(s) includes a second processor configured to perform a second method, the second method comprising:
generating said mappings between said registered network prefixes and said VPN gateways; and
distributing said mappings and associated metrics to said VPN gateway.

14. The system of claim 13, wherein the first method further comprises:
selecting a first remote VPN gateway for reaching a network prefix from said VPN gateway; and
establishing a first security association (SA) between said VPN gateway and said first remote VPN gateway.

15. The system of claim 14, wherein said selecting comprises selecting said first remote VPN gateway according to one or more of application types supported by said first remote VPN gateway, traffic types supported by said first remote VPN gateway, prefix administrative costs associated with said first remote VPN gateway, and preference values associated with said first remote VPN gateway.

16. The system of claim 14, wherein the first method further comprises:
measuring a performance level of said first SA; and
modifying said first SA according to said measured performance level.

17. A method for enabling routing among a plurality of protected enclaves, wherein each of the protected enclaves includes one or more plain text (PT) networks and is supported by one or more Virtual Private Network (VPN) gateways of a plurality of VPN gateways, the method comprising:
receiving a registration requests from a VPN gateways of the plurality of VPN gateways, wherein said registration requests includes network prefixes within said protected enclaves reachable by the VPN gateway;
generating mappings between registered network prefixes and VPN gateways enabled to reach said registered network prefixes, wherein said mappings have associated metrics for using said VPN gateways to reach said registered network prefixes;
transmitting the generated mappings to the VPN gateways;
receiving a query from the VPN gateway, wherein said query includes a target network prefix; and
transmitting to said VPN gateway mappings associated with said target network prefix, including addresses of VPN gateways of the plurality of VPN gateways enabled to reach said target network prefix.

18. The method of claim 17, wherein the method is performed by a Prefix Discovery Server (PDS).

19. The method of claim 18, further comprising:
exchanging the generated mappings with other Prefix Discovery Servers.

20. The method of claim 17, further comprising:
dynamically updating the generated mappings based on changes in network conditions and/or topology.

21. The method of claim 20, further comprising:
periodically distributing the generated mappings to registered VPN gateways.

* * * * *

UNITED STATES PATENT AND TRADEMARK OFFICE
CERTIFICATE OF CORRECTION

| | | |
|---|---|---|
| PATENT NO. | : 8,296,839 B2 | Page 1 of 1 |
| APPLICATION NO. | : 11/447092 | |
| DATED | : October 23, 2012 | |
| INVENTOR(S) | : Sax et al. | |

It is certified that error appears in the above-identified patent and that said Letters Patent is hereby corrected as shown below:

Column 9, Line 36, --network prefixes.-- should be replaced with "network prefixes,".

Column 10, Line 36, --said VPN gateways-- should be replaced with "said VPN gateway".

Column 10, Line 46, --prefixes wherein-- should be replaced with "prefixes, wherein".

Column 11, Line 18, --a VPN gateways-- should be replaced with "a VPN gateway".

Column 12, Line 4, --the VPN gateways-- should be replaced with "the VPN gateway".

Signed and Sealed this
First Day of January, 2013

David J. Kappos
*Director of the United States Patent and Trademark Office*